United States Patent
Bolze et al.

(10) Patent No.: US 10,016,825 B2
(45) Date of Patent: Jul. 10, 2018

(54) INTERNAL BEVEL GEAR

(71) Applicant: THE GLEASON WORKS, Rochester, NY (US)

(72) Inventors: Markus J. Bolze, Rochester, NY (US); Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 171 days.

(21) Appl. No.: 14/912,411

(22) PCT Filed: Aug. 27, 2014

(86) PCT No.: PCT/US2014/052848
§ 371 (c)(1),
(2) Date: Feb. 17, 2016

(87) PCT Pub. No.: WO2015/038334
PCT Pub. Date: Mar. 19, 2015

(65) Prior Publication Data
US 2016/0199926 A1    Jul. 14, 2016

Related U.S. Application Data

(60) Provisional application No. 61/876,859, filed on Sep. 12, 2013.

(51) Int. Cl.
*B23F 1/02* (2006.01)
*B23F 15/00* (2006.01)
(Continued)

(52) U.S. Cl.
CPC ................ *B23F 15/00* (2013.01); *B23F 1/02* (2013.01); *B23F 1/06* (2013.01); *F16H 55/17* (2013.01); *F16H 1/321* (2013.01)

(58) Field of Classification Search
CPC .... B23F 1/02; B23F 1/06; B23F 15/00; F16H 55/17; F16H 1/32
(Continued)

(56) References Cited

U.S. PATENT DOCUMENTS 1,815,336 A * 7/1931 Shlesinger .............. B23F 9/025
  451/147
3,053,017 A * 9/1962 Rosenthal ............... B23F 19/12
  451/121
(Continued)

FOREIGN PATENT DOCUMENTS

EP    1688202 A1    8/2006
GB    379637 A    9/1932

OTHER PUBLICATIONS

Cluff, Brian W., "Profile Grinding Gears From The Solid . . . Is It Practical?", Gear Technology, May/Jun. 1997, pp. 20-22, 24, 25.
(Continued)

*Primary Examiner* — Robert Rose
(74) *Attorney, Agent, or Firm* — Robert L. McDowell (57) ABSTRACT

A method of machining a bevel gear (22) having teeth with a pitch angle greater than 90 degrees comprising providing at least one tool (42, 44) rotatable about a tool axis with the tool comprising a disc-shaped body (43) having a periphery (49) and at least one stock removing surface (45, 47) arranged about the periphery. The tool is rotated and fed relative to the gear to effect machining of at least one tooth surface wherein the machining is carried out in a non-generating manner.

10 Claims, 12 Drawing Sheets

(51) Int. Cl.
*F16H 55/17* (2006.01)
*B23F 1/06* (2006.01)
*F16H 1/32* (2006.01)

(58) Field of Classification Search
USPC .................................. 451/47, 147, 219, 51
See application file for complete search history.

(56) References Cited

U.S. PATENT DOCUMENTS

| | | | |
|---|---|---|---|
| 3,184,988 A | 5/1965 | Osplack et al. | |
| 3,673,660 A * | 7/1972 | Osplack .................... | B23F 5/04 29/893.35 |
| 4,058,938 A * | 11/1977 | Harle ........................ | B23F 5/02 409/33 |
| 4,130,967 A * | 12/1978 | Easton ...................... | B23F 1/02 451/123 |
| 5,088,243 A * | 2/1992 | Krenzer .................. | B23F 9/025 451/11 |
| 6,227,775 B1 * | 5/2001 | Klammer ................ | B23F 1/065 409/25 |

OTHER PUBLICATIONS

International Search Report and Written Opinion for PCT/US2014/052848, ISA/EPO, dated Mar. 18, 2015, 11 pgs.

* cited by examiner

INTERNAL BEVEL GEAR

This application claims the benefit of U.S. Provisional Patent Application No. 61/876,859 filed Sep. 12, 2013, the entire disclosure of which is hereby incorporated by reference.

FIELD OF THE INVENTION

The invention is directed to bevel gears and in particular to internal bevel gears.

BACKGROUND OF THE INVENTION

High reduction transmissions can be realized with bevel ring gears that face each other with a shaft angle which is not equal to 180° (e.g. U.S. Pat. No. 7,147,583 to Lemanski). Such transmissions, known as pericyclic transmissions, comprise a system including a high reduction ratio, high tooth contact ratio, and nutating/rotating gear mechanism which incorporates meshing conjugate bevel ring gear or face-gear pairs. For example, the pericyclic transmission 2 shown in FIG. 1 has an input shaft 4 which is connected to a bearing 6 inclined at a nutating angle. The outer ring of the bearing is connected to the pericyclic motion converter 8 which has teeth on both faces. The number of teeth on the pericyclic motion converter 8 differs by between 1 and 4 from the number of teeth of a reaction control member 10 which is rigidly connected to the housing 12. Each rotation of the input shaft 4 will cause a nutation motion of the pericyclic motion converter 8 which is in mesh with the reaction control member 10 on the left side and an output gear 14 on the right side. The output gear 14 has the same number of teeth as the reaction control member 10.

Figure 1:
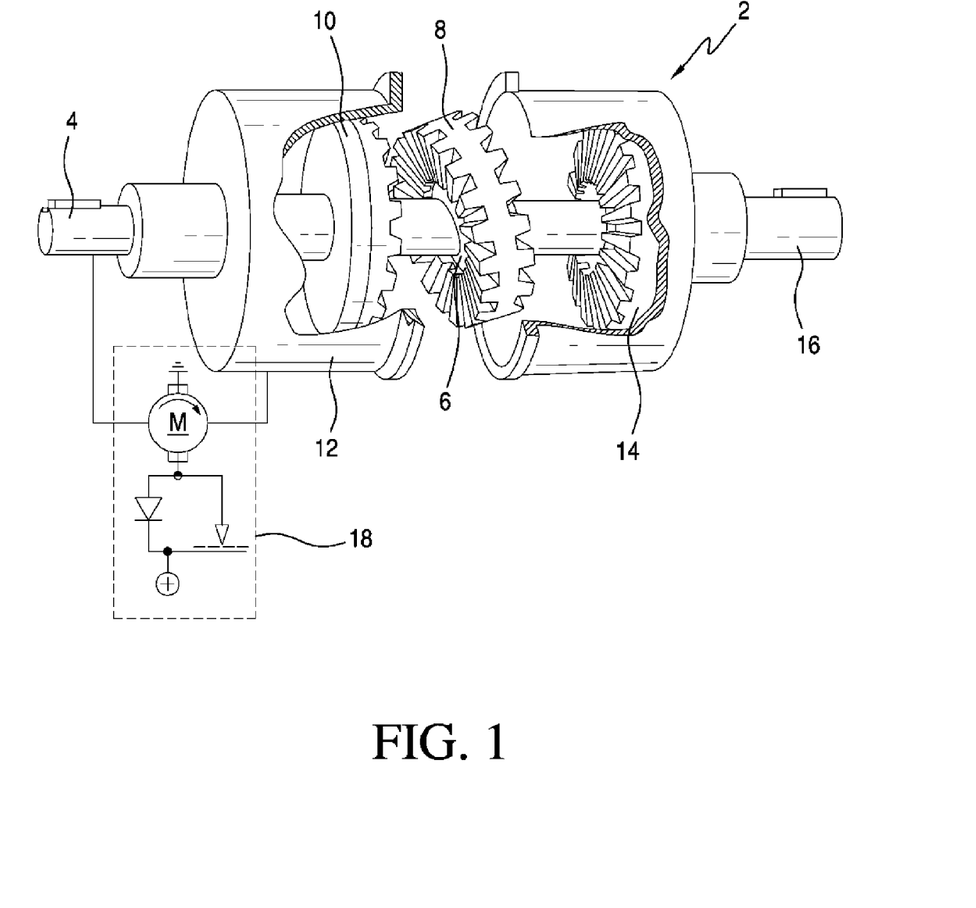
FIG. 1 shows a three dimensional, partially exploded view of a high reduction pericyclic transmission.

If the number of teeth on the pericyclic motion converter 8 is, for example, 2 higher than the number of teeth of the reaction control member 10 (and the output gear 14), then each revolution of the input shaft 4 will rotate the output shaft 16 (which is rigidly connected to the output gear) by 2 pitches (i.e. 2 teeth). If the number of teeth on the output gear is, for example, 54, then the ratio of the transmission is i=360°/[(360°/54)*2]=27 (or 27×1). This shows that the principle of a nutating pericyclic motion converter can realize very high speed reductions in a very compact arrangement with a low number of rotating parts. The contact ratio between the teeth of the pericyclic motion converter 8 and the reaction control member 10 as well as the output gear 14 is very high. It is possible that 5 or more teeth participate on the motion transmission which enables the use of rather small gears for a high torque transmission. The low rotational motion of the pericyclic motion converter 8 will minimize the energy loss due to friction in the tooth meshing process and therefore results in a high transmission efficiency.

It is possible to introduce additional rotation between the housing part 12, which is rigidly connected to the reaction control member 10, and the input shaft 4. This motion can be actuated by an electric motor 18 with variable speed control which is controlled by an electronic circuitry. This addition effectively converts the high reduction transmission into an infinite variable transmission.

Transmissions as described above have not been realized as production units in real industrial applications. Only prototypes have been manufactured using machining centers with ball nose end mills which required very long machining times and served the purpose of proving the concept of this transmission principle. The following observations have been made which explain the obstacle of industrial, cost-effective manufacturing of the gears especially the pericyclic motion converter 8.

The pitch cone apexes of the reaction control member 10 and the pericyclic motion converter 8 are coincident at the intersecting point of the axis of the two gear members which is given by physical law. An arrangement of this type is shown by the gears 20, 22 of FIGS. 2(a) and 2(b). This is also true if the number of teeth of the two facing ring gear combinations are different (as in the pericyclic transmission 2). If the two facing bevel ring gears have a shaft angle between 178° and 175°, then the pitch cone can be drawn as shown in FIG. 2(b) which means the reaction control member 10 (and the output gear 14) are external ring gears and the pericyclic motion converter 8 has internal bevel gears on both faces. For the purposes of discussion, external bevel gears are considered to be those gears having pitch angles of less than 90 degrees thereby having teeth that point outward and away from the axis of the gear. Internal bevel gears are considered to be those gears having pitch angles of greater than 90 degrees thereby having teeth that point inward toward the axis of the gear.

Internal spiral bevel gears cannot be manufactured conventionally because the cutter has to approach the tooth from the back side (FIGS. 2c and 2d) of the gear and would generate the tooth instead the slot. The result would be complete destruction of the internal gear. Even if it was possible (according to bevel gear generating principles) to cut the internal gear from the front (FIG. 2c), the circular cutter path would cause secondary cuts and lead to mutilations which would destroy the teeth at the opposite side of the cutting zone (e.g. FIG. 6, interference area).

Figure 3:
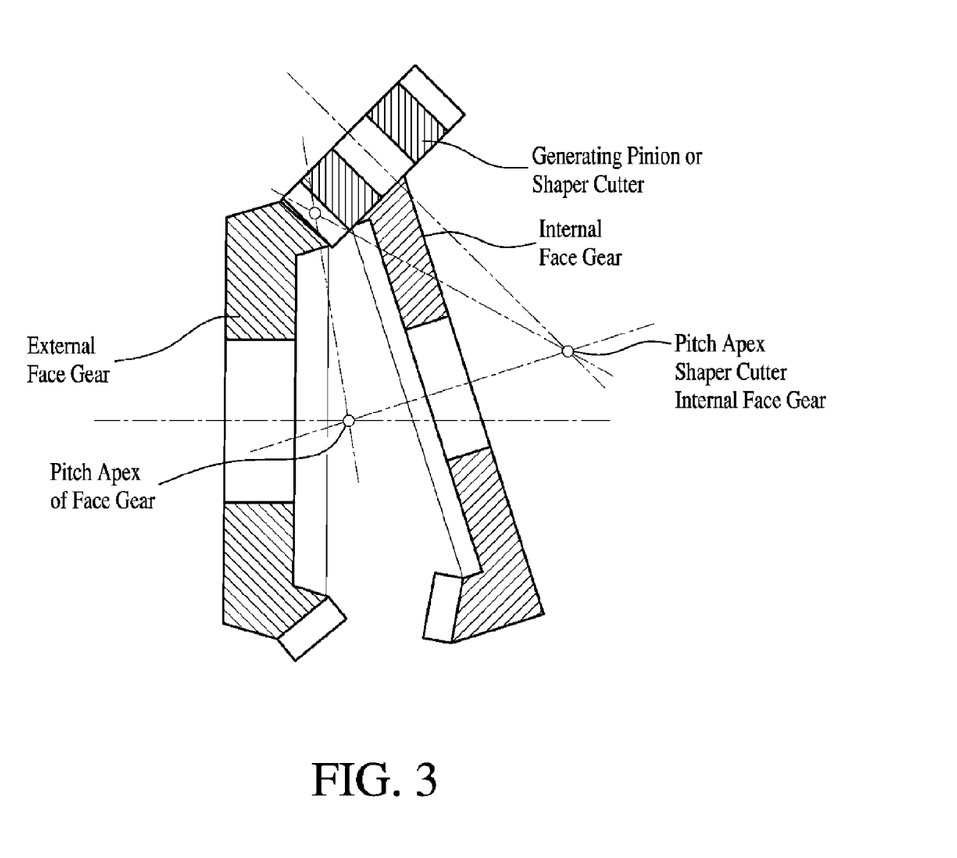
FIG. 3 shows a spur gear shaper cutter in a position where it generates an external face gear tooth on the left gear and in the same position an internal face gear tooth on the right gear.

Face gear solutions as indicated in FIG. 3 where the external and the internal face gear member can be derived from the same shaper cutter have also been disclosed. FIG. 3 shows a spur gear shaper cutter in a position where it generates an external face gear tooth on the left gear and in the same position an internal face gear tooth on the right gear. It can be observed that the shaper cutter approaches the external gear from the front (external), where the same section of the shaper cutter is supposed to form the teeth of the internal gear in the same position. This results in the shaper cutter destroying and eliminating the outer rim of the internal face gear in order to reach the tooth flanks from the back side. This relationship which is required in order to generate the correct mating flank to the external face gear cannot be realized in a practical manufacturing.

The discussion above identifies some of the reasons that have prevented the conventional manufacturing of internal bevel gears. The existing prototypes have been manufactured either with three dimensional printing or with ball nose end mills on multi-axis machining centers. The machining center, for example, typically utilizes surface coordinates which can be calculated using a cutting simulation that works regardless of the fact that in actual practice, the parts would be mutilated or destroyed while cutting the slots from the back side.

SUMMARY OF THE INVENTION

The present invention relates to a bevel gear set with a shaft angles below 180°, and preferably above 135°, which consists of an external and an internal bevel gear. The internal bevel gear is non-generated and is produced based on a complementary machine setup for generating the mating external gear. In order to manufacture the mating external gear member, the mirror image of the internal straight bevel gear is used as a generating gear.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

As discussed above, FIG. 1 shows a transmission in a partially exploded view with an input shaft 4 which is connected to a bearing 6 that is inclined under a nutating angle. The outer ring of the bearing is connected to the pericyclic motion converter 8 which has teeth on both faces with the number of teeth differing by 1 to 4 from the number of teeth of the reaction control member 10 which is rigidly connected to the housing 12. Each rotation of the input shaft 4 will cause a nutation motion of the pericyclic motion converter 8 which is in mesh with the reaction control member 10 on the left side and the output gear 14 on the right side. The output gear 14 has the same number of teeth than the reaction control member 10. If the number of teeth of the pericyclic motion converter 8 is two (2) higher than the number of teeth of the reaction control member 10 (and the output gear 14), then each revolution of the input shaft 4 will rotate the output shaft 16 (which is rigidly connected to the output gear 14) by 2 pitches (i.e. 2 teeth). For example, if the number of teeth of the output gear is 40, then the ratio of the transmission is i=360°/[(360°/40)*2]=20 (or 20×1). This shows that the principle of a nutating pericyclic motion converter can realize very high speed reductions in a very compact arrangement, with a low number of rotating parts. The contact ratio between the teeth of the pericyclic motion converter 8 and the reaction control member 10 as well as the output gear 14 is very high. It is possible that 5 and more teeth participate on the motion transmission which enables the use of rather small gears for a high torque transmission. The low rotational motion of the pericyclic motion converter 8 will minimize the energy loss due to friction in the tooth meshing process and therefore result in a high transmission efficiency.

As previously stated, it is possible to introduce an additional rotation between the housing part 12 (which is rigidly connected to the reaction control member 10) and the input shaft 4. This motion can be actuated by an electric motor 18 such as an electric motor with variable speed control which is controlled by electronic circuitry. This addition effectively converts the high reduction transmission into an infinite variable transmission.

Figure 2A:
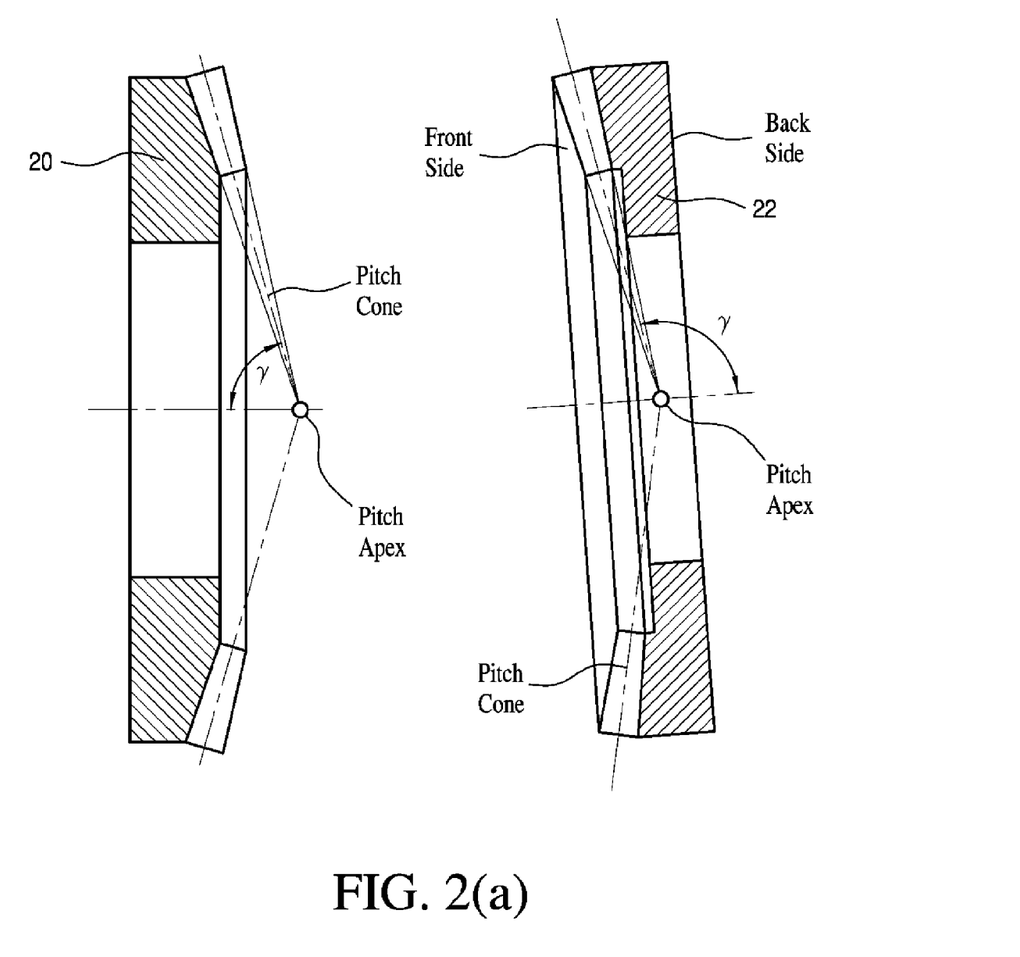
FIG. 2(a) shows an external straight bevel gear to the left and an internal straight bevel gear to the right.
Figure 2B:
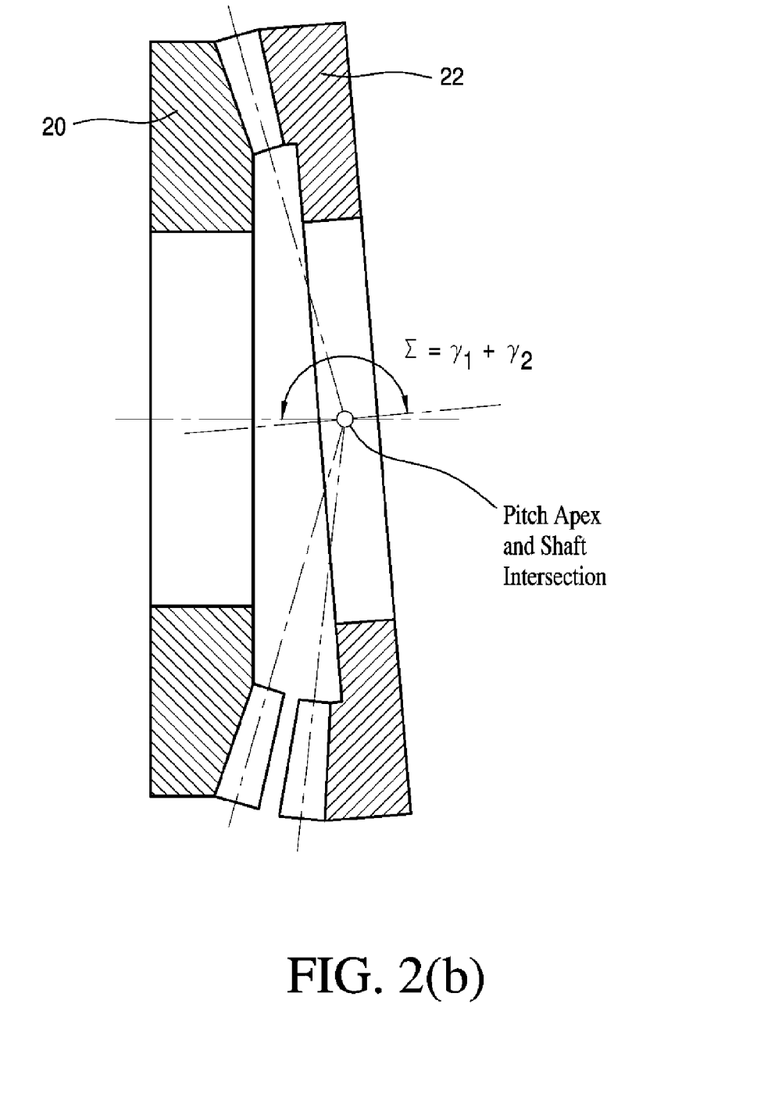
FIG. 2(b) shows the gears from FIG. 2(a) in a mesh position with coincident pitch cones.

FIG. 2(a) shows an external straight bevel gear 20 to the left and an internal straight bevel gear 22 to the right. The difference in tooth count between the two gears is this example is one. In such as arrangement, the internal gear 22 has the larger number of teeth. FIG. 2(b) shows the gears from FIG. 2(a) in a mesh position with coincident pitch cones and the pitch apex coincident with the shaft intersecting point. The difference in the pitch cone angles is equal to the shaft angle Σ minus 90°.

Figure 2C:
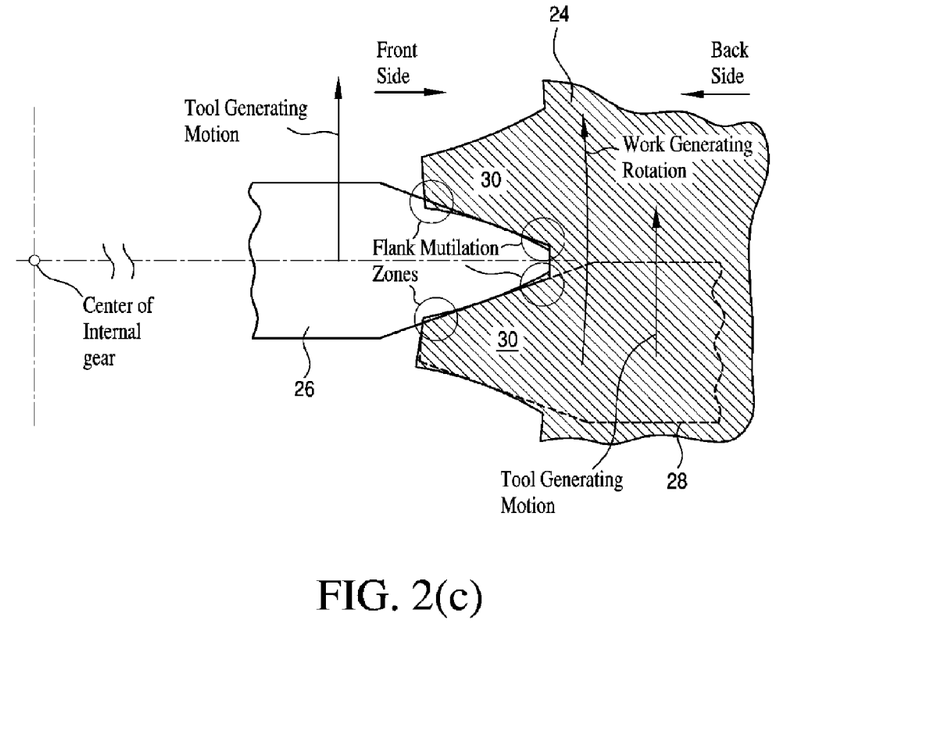
FIG. 2(c) shows a two dimensional section of an internal ring gear having a generated profile with a tool presented from the front side and another tool presented from the back side.
Figure 2D:
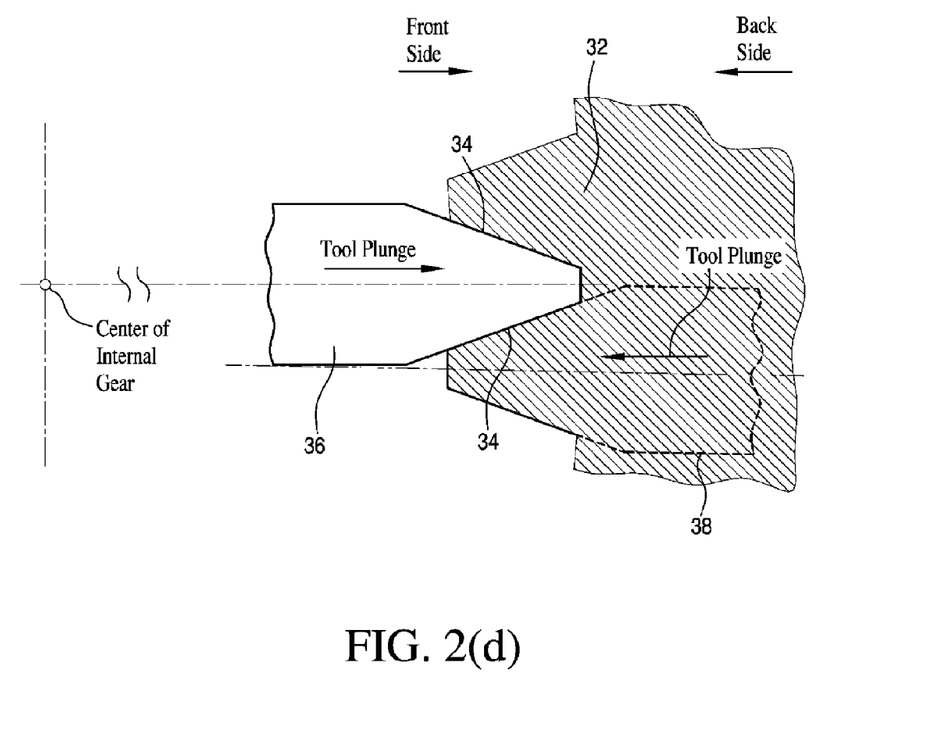
FIG. 2(d) shows a two dimensional section of an internal ring gear having a non-generated profile with a tool presented from the front side and another tool presented from the back side.

FIG. 2(c) shows a two dimensional section of an internal ring gear 24 with a tool 26 presented from the front side and another tool 28 presented from the back side. The tools represents one tooth of a generating gear (generating rack) which move vertical in the drawing while the internal work gear rotates around its center. If the profile of the internal gear should be generated with the tool 26 presented from the front side, then the concave profile of the teeth 30 becomes mutilated entirely in the generating position. If the profile of the teeth 30 should be generated with the tool 28 presented from the back side, then the entire blank of the work gear 24 will be destroyed.

FIG. 2(*d*) shows a two dimensional section of an internal ring gear 32 having non-generated tooth profiles 34. A tool 36 is presented from the front side and another tool 38 is presented from the back side. The tool 38 from the back side represents one tooth of a generating gear which is identical to the work gear (only plunging, no generating motion required). The tool 36 from the front side represents one tooth of a generating gear which is a mirror image of the work gear (only plunging, no generating motion required). If the profile should be formed with the tool 38 presented from the back side, then the entire blank of the work gear 32 will be destroyed. If the profile of the internal gear 32 should be formed with the tool 36 presented from the front side, then the correct flank form 34 is created without any risk of mutilation.

The invention relates to a bevel gear set with a shaft angles below 180° and preferably above 135°, which consists of an external and an internal bevel gear. If a rotation is transmitted between two shafts with a low inclination angle (e.g. FIG. 2*b*), then the bevel gear with the larger number of teeth becomes an internal gear ($\gamma_2 > 90°$) in cases where the pitch angle of the gear with the lower number of teeth $\gamma_1$ is below the shaft angle $\Sigma$ minus 90° ($\gamma_1 < \Sigma - 90°$).

According to the gearing law as applied to bevel gears, the number of teeth of both members as well as the shaft angle have the following relationship:

$$\frac{Z_1}{Z_2} = \frac{\sin\gamma_1}{\sin\gamma_2} \tag{1}$$

where:
$Z_1$=number of teeth of gear #1
$Z_2$=number of teeth of gear #2
$\gamma_1$=pitch angle of gear #1
$\gamma_2$=pitch angle of gear #2

The equation above presents two unknowns. In the case of a shaft angle, $\Sigma$, of 90 degrees, $\gamma_1 + \gamma_2 = 90°$ and $$\sin\gamma_2 = \sin(90° - \gamma_1) = \cos\gamma_1 \tag{2}$$

$$\text{where:} \tag{3}$$

$$\frac{Z_1}{Z_2} = \frac{\sin\gamma_1}{\cos\gamma_1} = \tan\gamma_1$$

$$\text{and} \tag{4}$$

$$\gamma_1 = \arctan\!\left(\frac{Z_1}{Z_2}\right)$$

In the case of $\Sigma \neq 90°$, an iterative solution is utilized to determine the pitch cone angles as shown in the Table below:

```
C_________________________________________________________________________
C
          SUBROUTINE PITCHCNE
C         ===================
C         ************************************************************
C----     TEST PROGAMM FOR ITERATIVE PITCH CONE CALCULATION
C----     IN CASE OF SIGMA =/= 90 deg
C         ************************************************************
C
C----     ITERATIVE SOLUTION OF THE FORMULA:
C
C                         SIN(GAMMA1)/SIN(GAMMA2) = Z1/Z2
C
C         WHERE:          GAMMA1+GAMMA2=SIGMA
C
C         EXAMPLE:
C
          Z1          = 54               ! NUMBER OF TEETH REACTION CONTROL MEMBER
          Z2          = 55               ! NUMBER OF TEETH GEAR
          SIGMA       = 177.             ! SHAFT ANGLE
C
          GAMMA0      = 90.                              ! ITERATION START VALUE
C
          DO 50  I    = 1,9000                           ! ITERATION LOOP
          GAMMA1      = ASIN((Z1/Z2)*SIN(SIGMA-GAMMA0))
          GAMMA2      = SIGMA-GAMMA1
          IF ((ABS(GAMMA1-GAMMA0)).LT.0.00001) GOTO 55   ! ABORTION CRITERIA
          GAMMA0      = GAMMA1                           ! RENEW n-1 VALUE
          GAMMA2      = SIGMA-GAMMA1
    50    CONTINUE                                       ! NEXT STEP
    55    CONTINUE                                       ! FINISHED
C
C----     RESULTS:
C
          GAMMA1      =  69.195 deg      ! PITCH ANGLE REACTION CONTROL MEMBER
          GAMMA2      = 107.805 deg      ! PITCH ANGLE OUTPUT GEAR
C
          RETURN
          END
C_________________________________________________________________________
C
```

The gear set described above can roll in mesh with conjugacy between their teeth which means the gear pair fulfills the gearing law and therefore rolls smooth with a constant ratio. The gear set is manufactured with the inclusion of lengthwise and profile crowning on the conjugate flank forms of both members in order to allow for load affected deflections. Internal bevel gearset have the potential for various industrial applications, such as pericyclic high reduction gearboxes. In the prior art, internal bevel gears have not been capable of manufacture according to the existing bevel gear manufacturing methods. The generating process of an internal bevel gear would require machining of the tooth slots not from the front, as schematically shown in FIG. 2(c), left, but from the back side of the part (see FIG. 2(c), right). Such a machining operation may be possible in theory to generate the flank surfaces, but in a real machining process it would destroy the back side of the gear blank and eventually eliminate the blank entirely.

Figure 4:
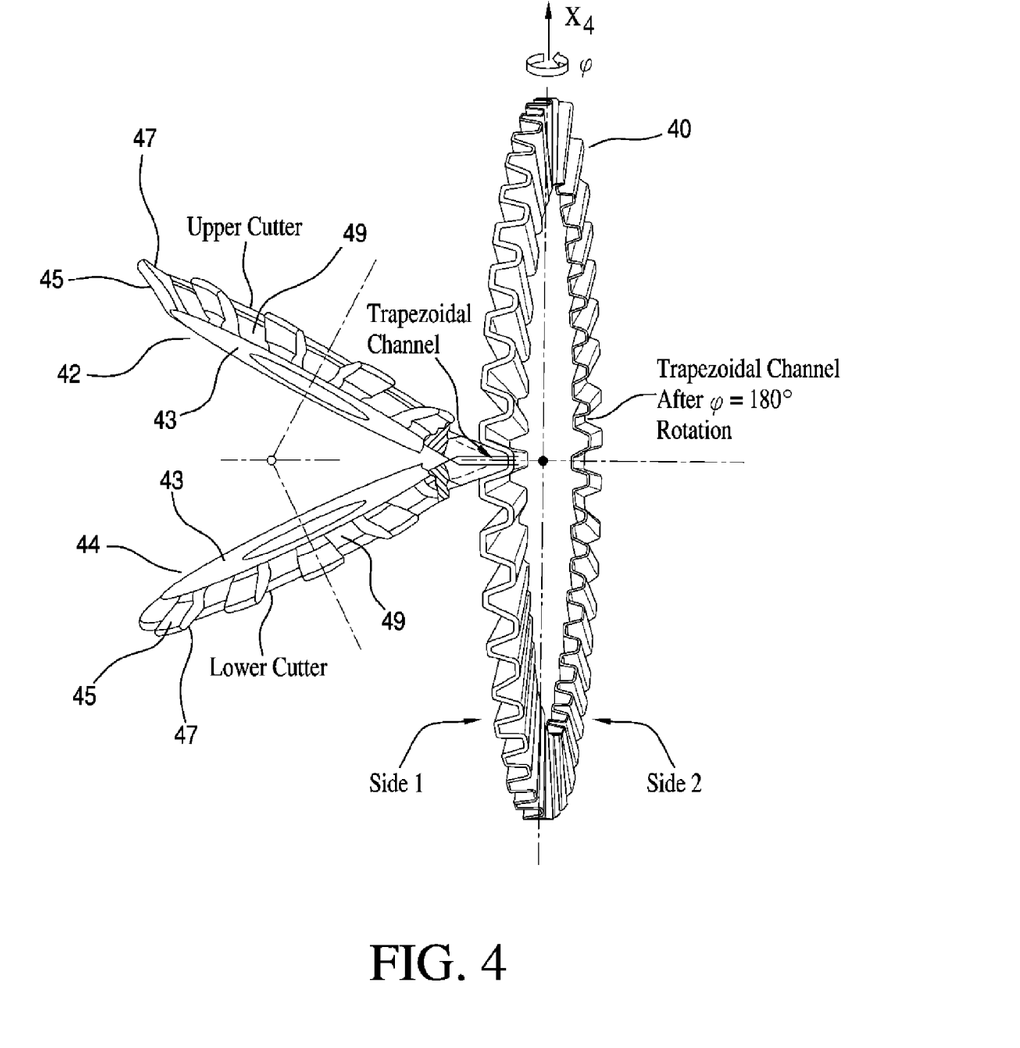
FIG. 4 shows a three dimensional view of a virtual plane generating gear and two interlocking cutters, forming one tooth of the generating gear.

The inventors recognized that in case of a non-generated straight bevel gears, the reference profile is a trapezoidal channel as can be seen in FIG. 4 which shows a three dimensional view of a virtual plane generating gear 40 and two interlocking cutters 42, 44 forming one tooth of the generating gear. Each cutter comprises a cutter body 43 having a plurality of cutting blades 45 arranged about the periphery 49 of the cutter body. Each cutting blade 45 has a cutting edge or surface 47. The trapezoidal channel, which is formed by the two cutters, is repeatedly formed in rotational distances of one pitch around the circumference of the plane generating gear 40. It was discovered that the trapezoidal channel has the same identical form on the front (e.g. Side 1) as it has on the back (e.g. Side 2). See FIG. 4, trapezoidal channel before and after $\varphi=180°$ rotation. In cases of radially proportional channels, it is possible to form the channels not only from side 1 but also from side 2. A rotation of 180° around the X4 axis will place the channel to the indicated position on side 2. It was further discovered that limited to non-generated bevel gears, any tooth geometry on a plane or conical bevel gear can be theoretically cut from both sides, realizing the identical flank form by utilizing the original tools, defined for the cutting from the back side.

Figure 5:
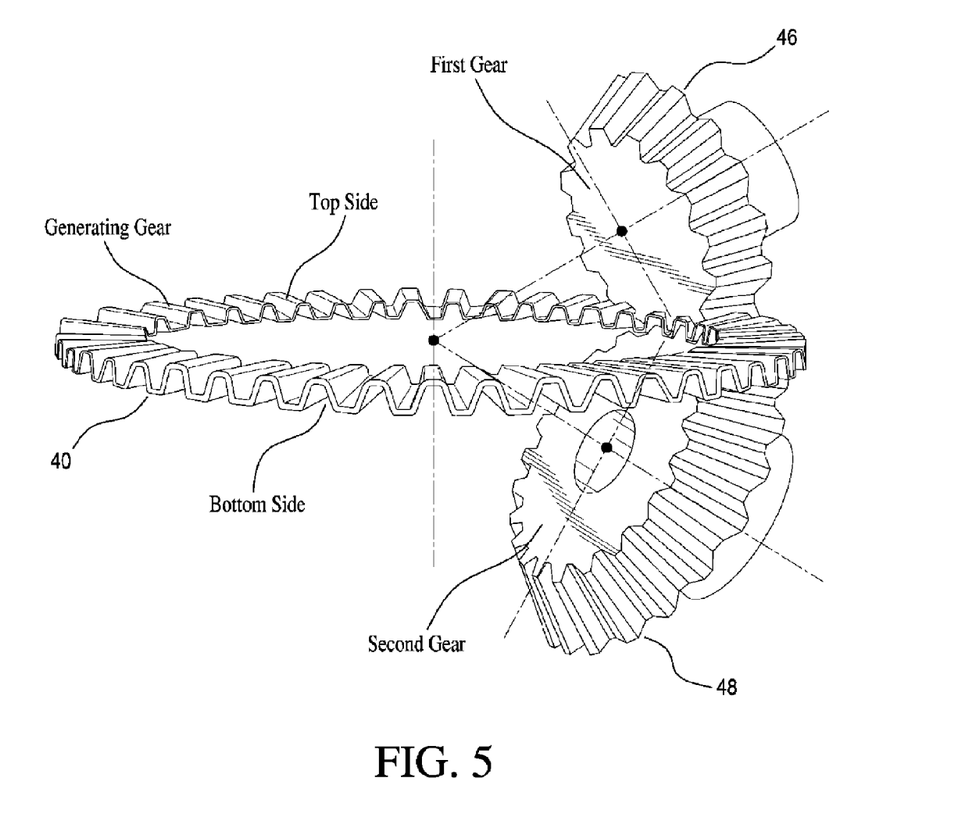
FIG. 5 shows a three dimensional view of the plane generating gear from FIG. 4 in a horizontal arrangement with a straight bevel pinion generated on top and a straight bevel gear generated on the bottom side.

FIG. 5 shows a three dimensional view of the plane generating gear 40 from FIG. 4 in a horizontal arrangement with a straight bevel pinion 46 generated on top and a straight bevel gear 48 generated on the bottom side. The tooth profiles of the generating gear 40 are trapezoidal channels that change their width and height from the outside to the inside proportional to the radial distance to the rotation axis of the generating gear. If the virtual generating gear is visualized to consist of a very thin material, then the tooth thickness and the slot width are equal on both sides. This makes it possible to generate a first gear on the top side and a second gear (with equal or different number of teeth on the bottom side of the same generating gear. As a consequence of the kinematic coupling conditions, established with this arrangement, the gear generated on the top side will mesh conjugate with the gear generated on the bottom side.

Figure 6:
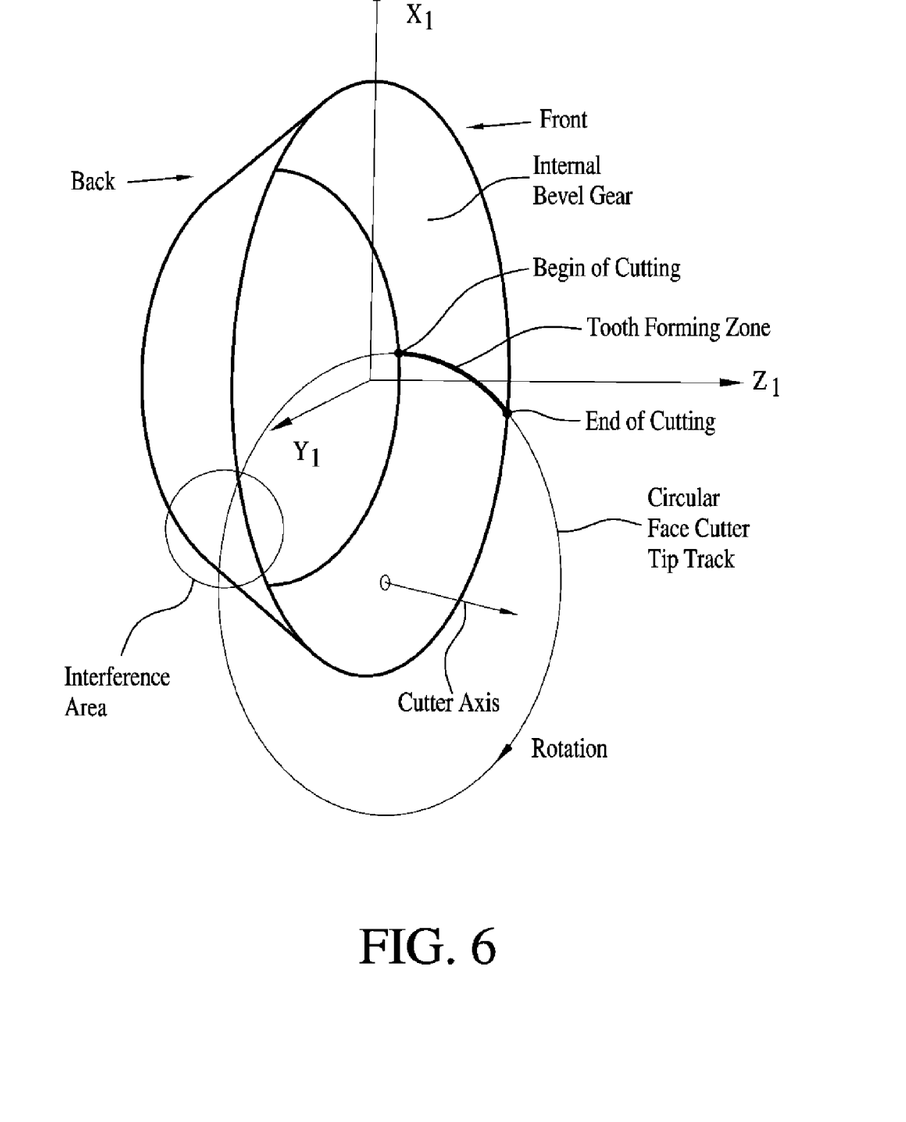
FIG. 6 shows a three dimensional view of a schematic representation of an internal bevel gear and a circular face cutter tip track with the interference area.

Since cutting of an internal bevel gear from the (originally correct) back side is physically not possible, the inventive solution is the cutting of internal straight bevel gears from the front side, which is the side where the teeth are exposed (see FIG. 2(a) for example) using identical tool geometry and a modified machine setup. Another element required to manufacture internal bevel gears is the avoidance of interference between the tool and the work piece in areas away from the cutting zone. This interference is not avoidable in case of face cutting (or grinding) tools. The tool tip track will cause destruction of a workpiece. FIG. 6 shows a three dimensional view of a schematic representation of an internal bevel gear and a circular face cutter tip track. Although this face cutter approaches the internal gear from the front side, it will create an interference area about opposite to the cutting zone which is caused by the angular inclination to fit the circular path of the face cutter to the internal zone and the fact that the blades which exit the cutting zone have to rotate along a circular track.

Figure 7:
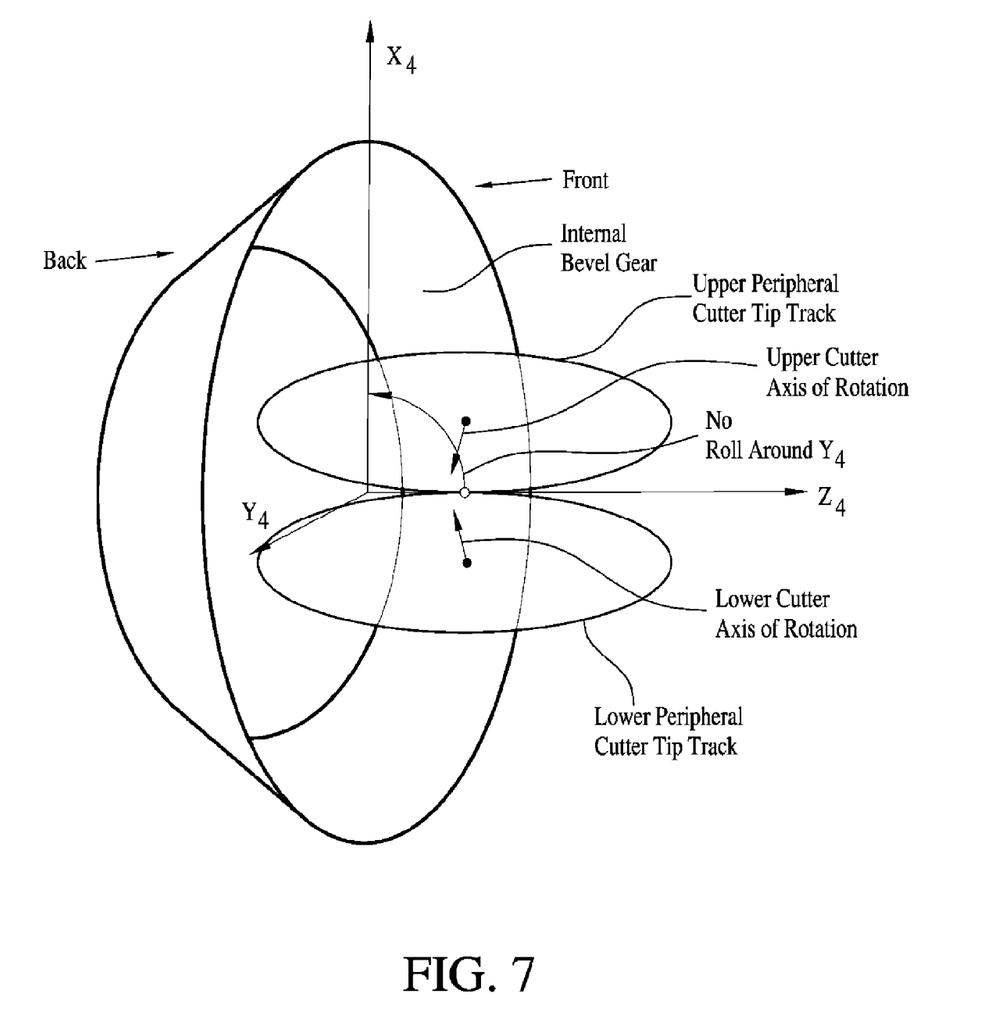
FIG. 7 shows a three dimensional view of a schematic representation of an internal bevel gear and two circular tip tracks of interlocking peripheral cutters.

Straight bevel gears produced with interlocking cutters of the type shown in FIG. 4 use peripheral cutters where the flank forming side of cutter and blades envelopes a plane which is perpendicular to the cutter axis. The two planes of the two cutters that form both flanks represent the surfaces of a trapezoidal channel as one tooth of the generating gear (see FIG. 4). FIG. 7 shows a three dimensional view of a schematic representation of an internal bevel gear and two circular tip tracks of interlocking peripheral cutters. The cutting edges of the peripheral cutters envelop a plane (the upper cutter on the top side and the lower cutter on the bottom side) which represent the "side walls" of the trapezoidal channel shown in FIG. 4. Interferences between the two cutters and the gear blank can be avoided since the cutter inclination is less than 45° with respect to the horizontal Y4-Z4 plane, and the cutter tip tracks move away to the front of the internal ring gear.

In case of cutting an internal gear as in FIG. 7, the cutters represented will not cause any interference. If the connected upper and lower cutters would perform a generating roll motion around axis Y4 in FIG. 7 then this would destroy the internal ring gear from the inside. Only the non-generated cutting tool setup, with peripheral cutters for straight bevel gears with the cutter positioned at the inside of the gear, adjacent to the slots will avoid mutilation and blank destruction.

Figure 8:
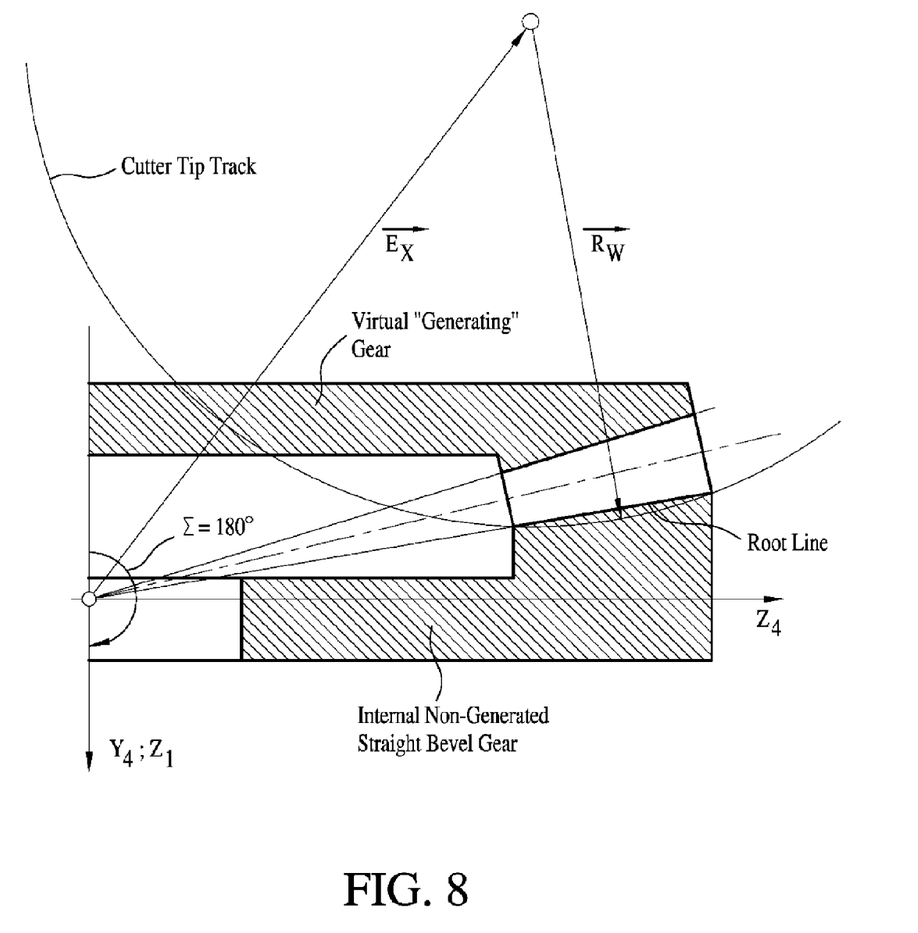
FIG. 8 shows the two dimensional top view onto the bevel gear basic machine (mathematical model) with a virtual conical generating gear and an internal straight bevel work gear.

FIG. 8 shows the two dimensional top view onto the bevel gear basic machine (mathematical model) with a virtual conical generating gear and an internal straight bevel work gear, formed by the generating gear, without generating motion because the machine root angle $\Sigma$ is 180° and the number of teeth of the generating gear and the work gear are identical. In case of a generating gear rotation, the work gear rotates with it without any relative motion. FIG. 8 shows an arrangement of a basic bevel gear machine with the vector EX which positions the center of the peripheral cutter and the cutter radius vector RW, and which points below the root at the center of the face width. EX is arranged such that the arc of RW intersects the theoretical root line at the heel and toe boundaries. The machine root angle $\Sigma$, between work gear axis Z1 and the generating gear axis Y4, is 180°.

Figure 9:
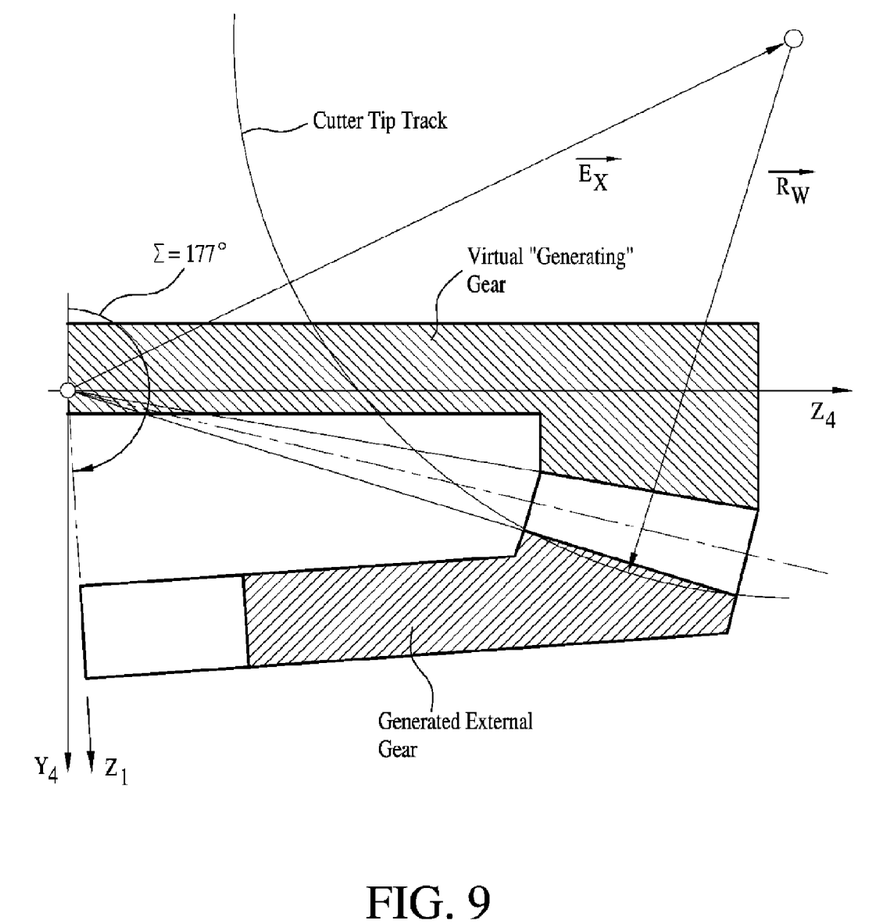
FIG. 9 shows the two dimensional top view onto the bevel gear basic machine with a virtual conical internal generating gear and an external straight bevel work gear.

FIG. 9 shows the two dimensional top view onto the bevel gear basic machine with a virtual conical internal generating gear and an external straight bevel work gear. The teeth of the work gear are formed by the generating gear with a generating motion, because the machine root angle $\Sigma$ is 177° (as shown by the example in the above Table) and the number of teeth of the generating gear and the work gear are different (55 and 54 respectively). In case of a generating gear rotation, the work gear rotates around a different axis than the generating gear which causes a relative (generating) motion.

The requirement for the non-generated teeth created according to FIG. 8 to roll correct and conjugate with the mating gear is a complementary setup of the machine which generates the mating gear. In order to manufacture a mating external gear member, the mirror image of the internal straight bevel gear is used as generating gear. This can be realized with the arrangement in FIG. 9. The cutter center is positioned at the tip EX. The cutter radius vector points at the center of the face width and the tip track intersects with the theoretical root line and the toe and heel boundaries. The machine root angle Σ is identical to the root angle between the internal and the external gear in their gearbox. According to the common rules of the gearing law, this root angle, in combination with the internal generating gear, requires a certain number of teeth. If the calculated number of teeth is not an integer, then an adjustment of the root angle is required to achieve an integer number of teeth. The rotation of the generating gear around axis Y4 and a rotation of the work gear around Z1 will cause a relative motion (generating motion) which will form external gear teeth which are exactly conjugate to the non-generated teeth of the internal member (FIG. 8). The generating gear in FIG. 9 represents the internal gear member, which is the main condition for the fulfillment of the gearing law between the two members and the conjugate rolling properties.

The internal bevel gear of the invention may be produced on any applicable gear manufacturing machine, preferably the multi-axis CNC gear manufacturing machine disclosed in U.S. Pat. No. 6,712,566 the disclosure of which is hereby incorporated by reference. A preferred cutting arrangement is to form each tooth slot with a single rotary disc-shaped cutter (e.g. 42 or 44 of FIG. 4) utilizing a first machining position for forming a first portion of the tooth slot and then repositioning the cutter to a second machining position for forming the remaining portion of the tooth slot. Such a method is disclosed in U.S. Pat. No. 7,364,391 the disclosure of which is hereby incorporated by reference.

A preferred cutter for producing internal bevel gears is a rotary disc-shaped solid cutter having straight cutting edges (surfaces) about the periphery thereof (e.g. 42 or 44 of FIG. 4) wherein the cutting edges envelope a plane which is perpendicular to the cutter axis thereby forming the straight "side walls" of the trapezoidal channel (e.g. as seen in FIG. 4) during the non-generating cutting process. However, the cutter may also be a peripheral cutter utilizing replaceable inserts or stick-type cutting blades with straight cutting edges thereby also enveloping a plane. Alternatively, the cutting edges may be curved resulting in profile curvature of the tooth surface. Additionally, the cutter axis may be tilted, thereby enveloping an inner cone, to effect lengthwise crowning (curvature) of the tooth surface.

The invention also contemplates finishing (e.g. grinding) of internal bevel gears with a peripheral tool wherein, for example, an abrasive material is arranged about the periphery of a disc-shaped tool body. Alternatively, the cutting blades discussed above may be replaced with finishing blades (e.g. skiving blades).

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining an internal bevel gear having teeth with a pitch angle greater than 90 degrees, said method comprising:
   providing at least one tool rotatable about a tool axis, said tool comprising a disc-shaped body having a periphery and at least one stock removing surface arranged about said periphery,
   rotating said at least one tool about a tool axis,
   feeding said at least one tool relative to said gear,
   machining at least one tooth surface in said gear wherein said machining is carried out in a non-generating manner.

2. The method of claim 1 wherein said tool comprises a cutting tool having at least one cutting blade with a cutting edge.

3. The method of claim 1 wherein said tool is a finishing tool.

4. The method of claim 3 wherein said finishing tool comprises a grinding wheel.

5. The method of claim 1 wherein during said machining, said at least one stock removing surface defines an enveloping plane perpendicular to said tool axis thereby forming a tooth surface profile that is straight.

6. The method of claim 1 wherein during said machining, said at least one stock removing surface defines an enveloping curve thereby forming a tooth surface profile that is curved.

7. The method of claim 1 further comprising positioning said tool axis whereby said machining provides a lengthwise crowning on a tooth surface.

8. The method of claim 2 wherein said disc-shaped body and said at least one stock removing surface are unitary.

9. The method of claim 2 wherein said at least one stock removing surface comprises stick-type cutting blades.

10. The method of claim 2 wherein said at least one stock removing surface comprises replaceable cutting inserts.

* * * * *